United States Patent [19]
Kim

[11] Patent Number: 5,822,478
[45] Date of Patent: Oct. 13, 1998

[54] OPTICAL DEVICE WITH MEANS FOR PREVENTING REMAINING SCATTERED LIGHT RAYS FROM BEING FED BACK TO THE SIGNAL LINE AND METHOD FOR FABRICATING IT

[75] Inventor: Yeong-Ju Kim, Gumi, Rep. of Korea

[73] Assignee: SamSung Electronics Co., Ltd., Suwon, Rep. of Korea

[21] Appl. No.: 753,249

[22] Filed: Nov. 22, 1996

[30] Foreign Application Priority Data

Nov. 22, 1995 [KR] Rep. of Korea .................. 42982/1995

[51] Int. Cl.⁶ .............................. G02B 6/32; G02B 6/36; G02B 6/38
[52] U.S. Cl. ................................ 385/33; 385/31; 385/59; 385/60; 385/74; 385/78; 385/88; 385/93
[58] Field of Search .................................. 385/31–35, 16, 385/18, 55, 59, 60, 71, 74, 72, 78, 88, 89, 93, 116, 119

[56] References Cited

U.S. PATENT DOCUMENTS

| | | |
|---|---|---|
| 4,449,782 | 5/1984 | Korth .......................................... 370/3 |
| 4,575,181 | 3/1986 | Ishikawa ..................................... 385/33 |
| 4,735,477 | 4/1988 | Bowen ........................................ 385/31 |
| 5,134,674 | 7/1992 | Huber ......................................... 385/61 |
| 5,225,942 | 7/1993 | Ikeno et al. ............................... 359/836 |
| 5,267,337 | 11/1993 | Kirma ......................................... 385/75 |
| 5,337,377 | 8/1994 | Yamada et al. ............................ 385/31 |
| 5,337,385 | 8/1994 | Baderschneider et al. ................ 385/59 |
| 5,553,180 | 9/1996 | Belenkiy et al. .......................... 385/59 |
| 5,566,262 | 10/1996 | Yamane et al. ............................ 385/33 |

*Primary Examiner*—Hemang Sanghavi
*Attorney, Agent, or Firm*—Robert E. Bushnell, Esq.

[57] ABSTRACT

An optical device comprises a signal transmission optical fiber for transmitting an input light signal to an output port, a scattered light rays absorbing optical fiber for absorbing multiply reflected light rays generated in the optical device, a ferrule for fixedly holding the signal transmission optical fiber and scattered light rays absorbing optical fiber, a lens for focusing the input light signal transmitted through the signal transmission optical fiber, and a sleeve for fixedly aligning the ferrule and the lens, thereby preventing the reflected light rays from being fed back to the signal transmission optical fiber.

21 Claims, 7 Drawing Sheets

OPTICAL DEVICE WITH MEANS FOR PREVENTING REMAINING SCATTERED LIGHT RAYS FROM BEING FED BACK TO THE SIGNAL LINE AND METHOD FOR FABRICATING IT

CLAIM OF PRIORITY

The present application is based on Korean Application 42982/1995, filed Nov. 22, 1995 to the Korean Industrial Property Office, which is incorporated herein by reference.

BACKGROUND OF THE INVENTION

1. Field of the Invention

The present invention generally concerns an optical device and particularly concerns an optical device with means to prevent reflected light rays from inhibiting effective transmission.

2. Description of the Related Art

In the art of optical fiber communication, an optical device uses an optical fiber to transmit light signals. An optical device may include a signal transmission optical fiber for transmitting an input light signal to an output port and include a lens for collimating and focusing the input light signal transmitted through the signal transmission optical fiber. The optical device may also include a ferrule for fixing and holding the signal transmission optical fiber and include a sleeve for fixing and aligning the ferrule and the lens. In such a device, when the input light signal is transmitted through the signal transmission optical fiber to the lens, a part of the input light signal can be changed into multiply reflected light rays in the space between the ferrule and the lens. This can cause a considerable amount of noise, transmission reflective loss, and other problems. Thus, there is a need for an effective optical device that handles these problems. On this matter, one of the techniques of the present invention is to provide an optical device with means for preventing the scattered light rays, multiply reflected in the device during signal transmission, from being fed back to the signal line.

Exemplars of the contemporary practice includes Huber (U.S. Pat. No. 5,134,674, *Reflection Coupling of Optical Fibers*, Jul. 28, 1992) disclosing a connector assembly having a mirror for coupling light signals from one optical fiber to at least one other optical fiber. The light emanated from one of the optical fibers is transmitted to another of the optical fibers. Kirma (U.S. Pat. No. 5,267,337, *Combined Connector For Coupling Electrical Conductors And Optical Conductors Respectively*, Nov. 30, 1993) discloses a combined connector for coupling an electrical conductor with another electrical conductor and for also coupling an optical conductor with another optical conductor in the same housing for electrical and light conductor cables. The coupling components cooperate with each other. Baderschneider et al. (U.S. Pat. No. 5,337,385, *Optical Waveguide Terminating Device*, Aug. 9, 1993) discloses a terminating device for at least one optical waveguide, an optical waveguide connector and an optical waveguide connector assembly. The areas to be optically coupled are held parallel. Belenkiy et al (U.S. Pat. No. 5,533,180, *Adapter Assembly For Fiber Optic Connectors*, Sep. 3, 1996) discloses a terminating device for an optical waveguide which comprises a sleeve-like terminating member in which an optical waveguide section having a coupling face ground to be plane is glued on the one hand and in which an optical waveguide abutting said optical waveguide section is inserted on the other hand. Such a terminating member can be used in an optical waveguide connector. The optical fiber connectors are biased to a substantially parallel relationship. Yamane et al. (U.S. Pat. No. 5,566,262, *Optical Fiber Array And A Method Of Producing The Same*, Oct. 15, 1996) discloses an optical fiber array which includes a plurality of optical fibers which are arranged and fixed in a fiber array member. The optical fibers each have an end projecting from an end face of the fiber array member at substantially the same distance, and each have a lens formed at the end thereof. From my study of the art along with these exemplars of the contemporary practice, there is a need for an effective optical device with means for preventing the scattered light rays, multiply reflected in the device during signal transmission, from being fed back to the signal line.

SUMMARY OF THE INVENTION

It is an object of the present invention to provide an improved optical device.

It is an object of the present invention to provide an optical device with means for preventing the scattered light rays, multiply reflected in the device during signal transmission, from being fed back to the signal line.

It is an object of the present invention to provide an optical device with means for absorbing and discharging outside the multiply reflected light rays generated in the optical transmission device, so as to eliminate noises. This is to improve and to stabilize the light signal transmission characteristics of the optical transmission device, so as to assure the light transmission characteristics that are required for transmitting a great amount of light signals at a high speed.

It is another object of the present invention to provide an optical device with means for supplying a light signal linearly formed according to the output of a light source. The means minimizes the signal distortions caused by the multiple reflection in a multiple wavelength and multiple time signal transmission system.

It is still another object of the present invention to provide an optical signal transmission system with means for utilizing the multiply reflected light rays to monitor a signal transmission line by means of detecting the changes made according to time and external environment.

In order to achieve one or more of the above objects, there is provided an optical device including a signal transmission optical fiber for transmitting an input light signal to an output port, a scattered light rays absorbing optical fiber for absorbing multiply reflected light rays generated in the optical device, a ferrule for fixedly holding the signal transmission optical fiber and scattered light rays absorbing optical fiber, a lens for focusing the input light signal transmitted through the signal transmission optical fiber, and a sleeve for fixedly aligning the ferrule and the lens. This prevents the reflected light rays from being fed back to the signal transmission optical fiber.

In order to achieve one or more of the above objects, there is provided a method of fabricating an optical device for preventing scattered light rays generated in the device from being fed back to signal lines. The method includes the steps of fabricating a signal transmission optical fiber for transmitting an input light signal to an output port or an output signal to an input port, fabricating a scattered light rays absorbing optical fiber for absorbing multiply reflected light rays generated in the device to prevent them from being fed back to the signal transmission optical fiber, providing the outer end of the absorbing optical fiber with a scattered light absorber coated with a reflection absorbing material or ground at an angle so as to prevent scattered light rays from being transmitted back to the output port, providing a ferrule for fixedly holding the signal transmission optical fiber and absorbing optical fiber, fixing the signal transmission optical fiber inside the ferrule, fixing the absorbing optical fiber inside the ferrule at a distance (d) from the signal transmission optical fiber, the distance (d) being a given multiple of the signal wavelength, grinding the outer end surface of the ferrule containing the signal transmission optical fiber and absorbing optical fiber, providing a lens for focusing the input light signal transferred through the signal transmission optical fiber, providing a sleeve for aligning the ferrule and the lens with a given space, and fixing the ferrule and lens in the sleeve.

The present invention will now be described more specifically with reference to the attached drawings and be described by way of examples.

DETAILED DESCRIPTION OF THE PREFERRED EMBODIMENTS

Figure 1:
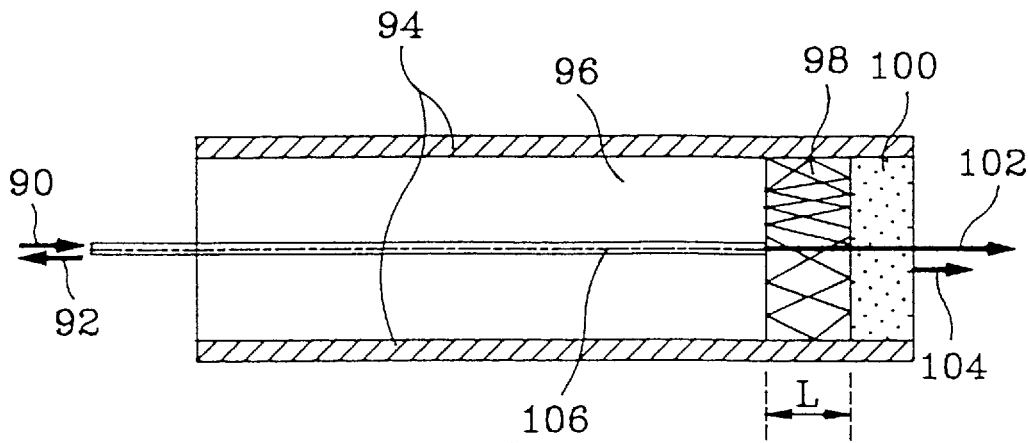
FIG. 1 is a schematic diagram illustrating an optical device of a contemporary practice and a multiple reflection mechanism thereof.

Turning now to the drawings, FIG. 1 shows an optical device according a contemporary practice. As shown in FIG. 1, the optical device includes a signal transmission optical fiber 106 for transmitting an input light signal 90 to an output port, a ferrule 96 for fixedly holding the signal transmission optical fiber 106, a lens 100 for focusing the input light signal 90 transmitted through the signal transmission optical fiber 106, and a sleeve 94 for fixedly aligning the ferrule 96 and a lens 100.

In such a device of FIG. 1, when the input light signal 90 is transmitted through the signal transmission optical fiber 106 to the lens 100, a part of the input light signal 90 is changed into multiply reflected light rays 98 in the space (of a length L) between the ferrule 96 and the lens 100. Rays come out of the lens 100 as rays 102 and 104. Although a principal part of the input light signal 90 is focused by the lens 100 transferred to the output port, a part of the multiply reflected light rays 98 is fed back to the signal transmission optical fiber 106 as scattered rays 92. A part of the multiply reflected light rays is transferred again to the inside of the optical transmission device along with the input light signal 90. A part of the multiply reflected light rays is transferred to the output port. This causes considerable noise, transmission reflective loss, etc. In order to resolve such drawbacks, there have been proposed solutions such as the precise angle grinding and the anti-reflective coating at connecting surfaces of an optical device. Such, however, would complicate the manufacturing process, thereby resulting in an increase of the cost as well as lowering the reliability of the device.

Figure 2:
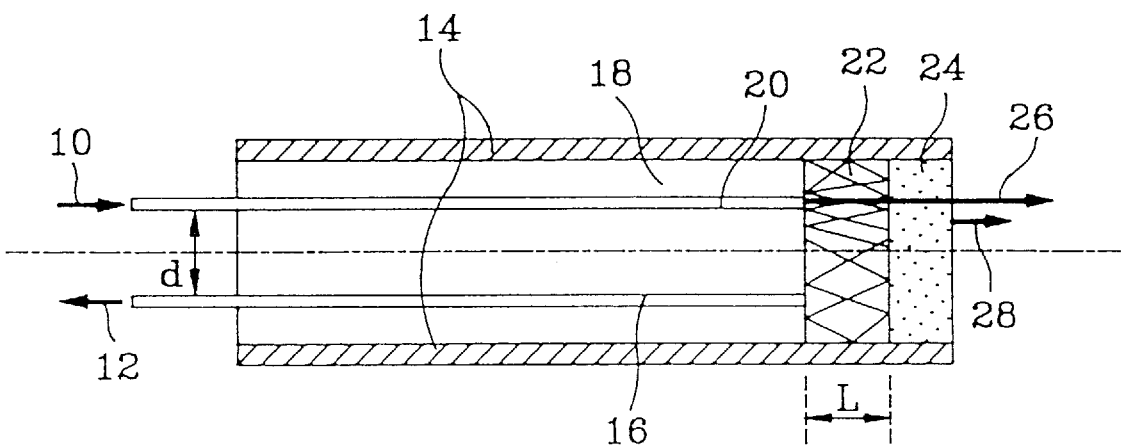
FIG. 2 is a schematic diagram illustrating an optical device built according to the principles of an embodiment of the present invention and a multiple reflection mechanism thereof.
Figure 3:
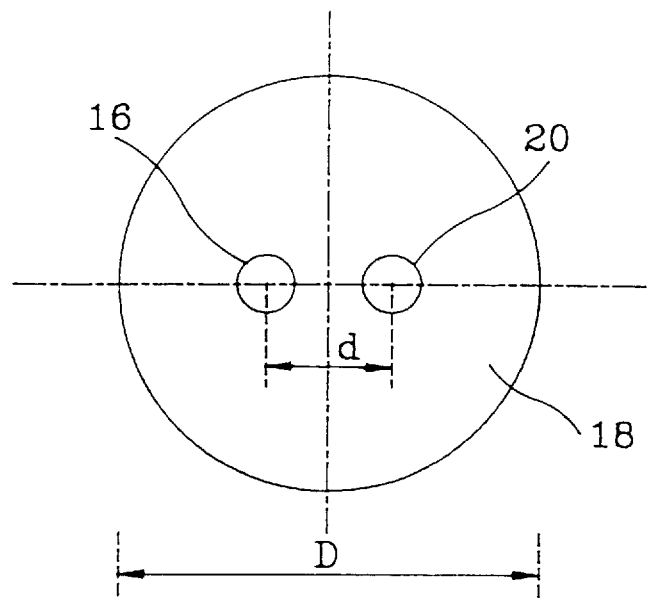
FIG. 3 is a schematic cross sectional view depicting a ferrule built according to the principles of the present invention, the ferrule holding a signal transmission optical fiber and a scattered light rays absorbing optical fiber.

FIGS. 2 and 3 show an another way. Referring to FIGS. 2 and 3, an optical device of the present invention includes a signal transmission optical fiber 20 for transmitting an input light signal 10 to an output port (or an output light signal to an input port), and a scattered light rays absorbing optical fiber 16 for absorbing multiply reflected light rays 22 generated in the optical device. The scattered light rays absorbing optical fiber 16 includes a multiple mode optical fiber made of a glass material. The signal transmission optical fiber 20 and scattered light rays absorbing optical fiber 16 are fixedly held by a ferrule 18, whose surface is covered with an anti-reflection coating to reduce reflective loss. In addition, the optical device has a lens 24 for focusing the input light signal 10 transmitted through the signal transmission optical fiber 20. The lens 24 is separated from the optical fiber 20 by a space of length L. Rays come out of the lens 24 as rays 102 and 104. A sleeve 14 aligns the lens 24 and the ferrule 18.

During operation of the optical device, the input light signal 10 is transmitted through the signal transmission optical fiber 20 to one end of the lens 24. At the lens 24, a part of the input light signal 10 is changed into multiply reflected light rays 22 between the ferrule 18 and the lens 24. As for a part of the input light signal 10 focused by the lens 24 (rather than being the multiply refracted light rays 22), the part of the input light signal 10 focused by the lens 24 is transferred to the output port. Most of the multiply reflected light rays 22 are changed into scattered light rays 12. Some of the scattered light rays 12 are discharged to the outside, through the scattered light rays absorbing optical fiber 16. The remaining portion (which is a slight portion) of the multiply reflected light rays 22 is transferred to the output port, along with the input light signal 10. The operation of the scattered light rays absorbing optical fiber 16, the operation preventing the scattered light rays from being fed back to the signal transmission optical fiber 20, is more specifically described with reference to the experimental data and simulation graphs illustrated in FIGS. 8 to 11. Such specific description is in the following paragraphs.

Figure 8:
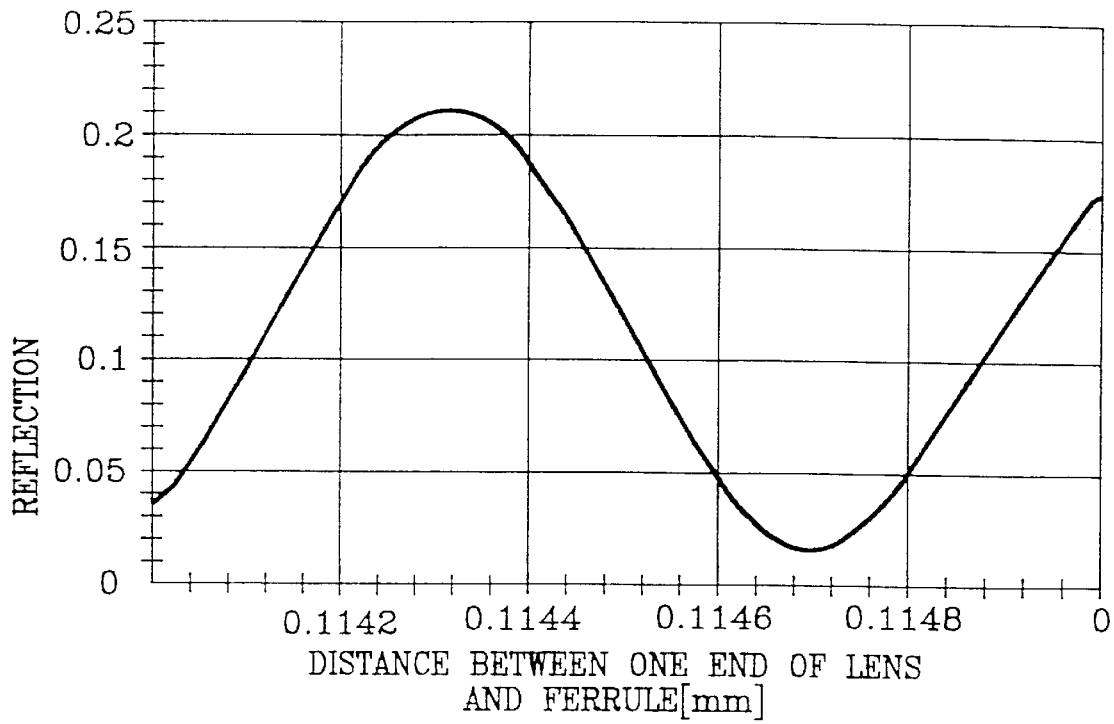
FIG. 8 is a graph illustrating a reflectivity of light varying with distance between the end surface of an inventive ferrule and a lens.

FIG. 8 shows a graph of the reflectivity of light varying with distance between the end surface of a ferrule and a lens. The graph assumes that the surface of the ferrule is ground to have eight degrees. The surfaces of the ferrule and the lens are not covered with an anti-reflective coating (AR coating).

The radius of the lens is 1 mm. The refraction index of the lens is 1.814 at the wavelength of 1550 nanometers. In the graph, the transverse axis represents the distance L between the rear end surface of the ferrule and the front surface of the lens. The longitudinal axis represents the reflectivity (maximum being 1). The minimum reflectivity (1%) is shown at the distance L of 0.1146. The reflected light rays of 1% undergo continuous reflections within the distance L, resulting in instability of the output. For example, in the contemporary practice illustrated in FIG. 1, the output signal 102 and the multiply reflected light rays 104 are fed back to and are output through the signal transmission optical fiber.

Figure 9:
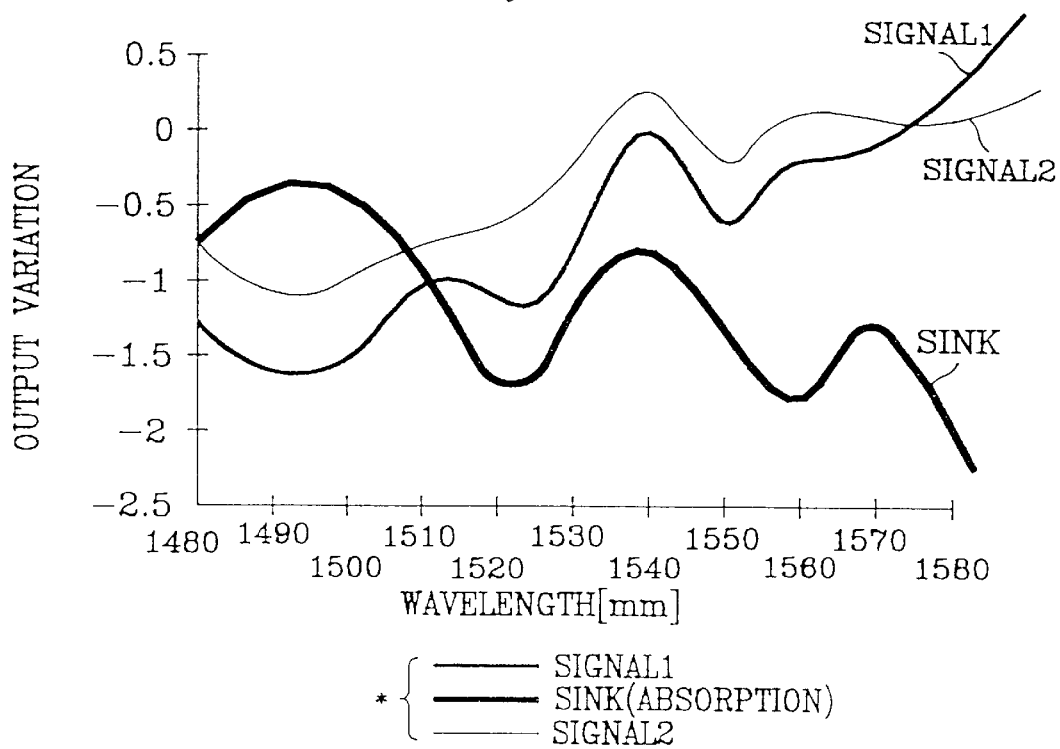
FIG. 9 is a graph illustrating output variations of an optical device, built according to the principles of the present invention, with wavelength.

FIG. 9 shows a graph of output variations. In FIG. 9, SIGNAL 1 represents the output light signal of an optical device of the present invention as illustrated in FIG. 2, which is the sum of the original output light signal 26 and the multiply reflected light rays 28 fed back to and output through the signal transmission optical fiber. 20. SINK represents the scattered light rays 12 absorbed by the scattered light rays absorbing optical fiber 16. SIGNAL 2 represents the output light signal of an optical device of the contemporary practice as illustrated in FIG. 1, which is the sum of the original output light signal 102 and the multiply reflected light rays 104 fed back to and output through the signal transmission optical fiber. Here, the value of the output light signal SIGNAL 1 (output light signal of an optical device of the present invention as illustrated in FIG. 2) is shown as being lowered by an average of 0.4 to 0.5 decibels (dB) than that of the conventional output signal SIGNAL 2 (output signal of an optical device of the contemporary practice as illustrated in FIG. 1). The difference is caused by the multiply reflected light rays rather than experimental errors. Namely, the ferrule 96 (of an optical device of the contemporary practice as illustrated in FIG. 1) permits most of the multiply reflected light rays being fed back to the signal transmission optical fiber 106 while the ferrule 18 (of an optical device of the present invention as illustrated in FIG. 2) forces the additional scattered light rays absorbing optical fiber 16 absorb the multiply reflected light rays that are discharged to the outside. The signal SINK represents the reflected light rays discharged outside through the absorbing optical fiber 16. The variation rate of signal SINK can have a difference of more than −30 decibels (dB) compared to the variation rate of a signal carried by the transmission optical fiber. The signals SIGNAL 1, SIGNAL 2, and SINK are represented in the same graph in order to illustrate their variations.

Figure 10:
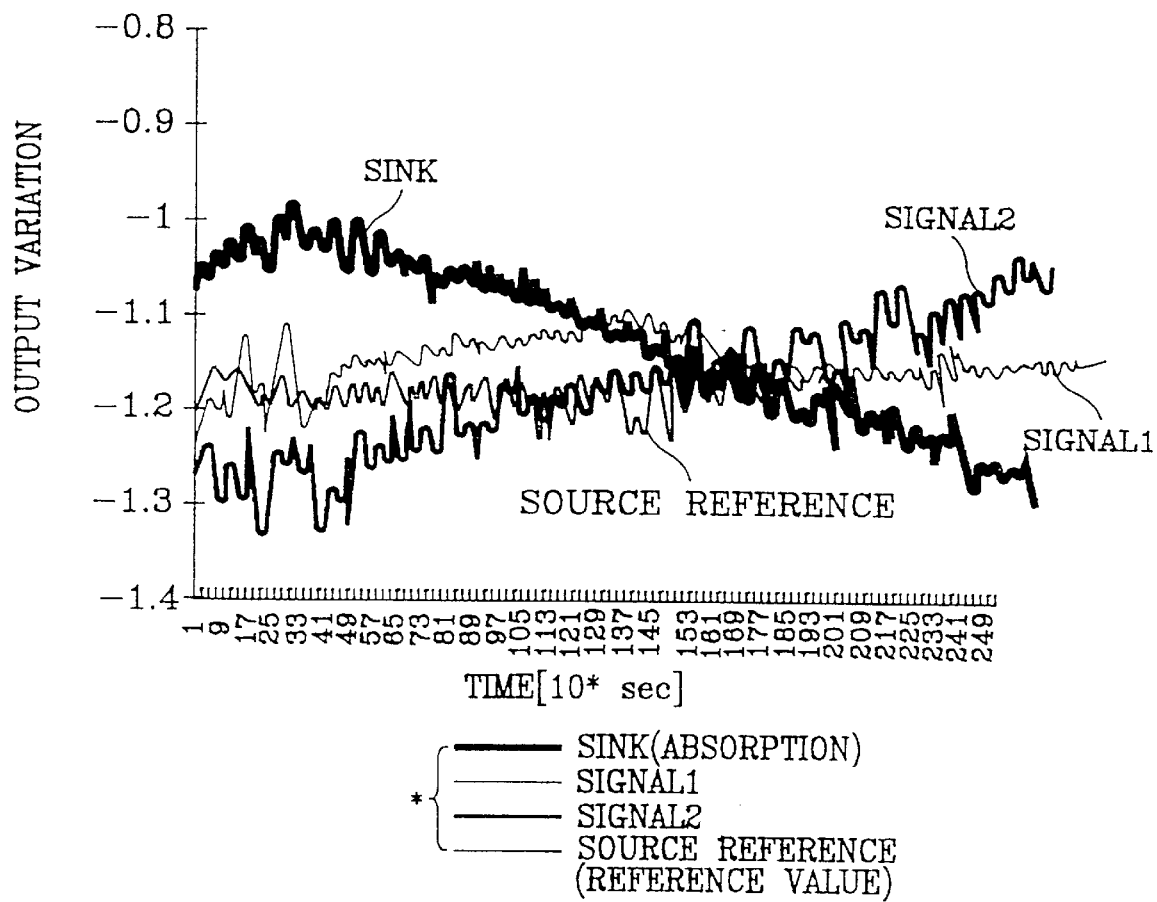
FIG. 10 is a graph illustrating output variations of an optical device, built according to the principles of the present invention, with time.

FIG. 10 shows a graph of output variations versus time. The graph of FIG. 10 illustrates the situation of using the wavelength of 1550 nanometers. The source reference represents a relatively stable, wavelength variable light source used in this experiment with time. For a given time of 42 minutes, the SIGNAL 2 (output signal of an optical device of the contemporary practice as illustrated in FIG. 1) shows the variation rate of 0.4 decibels (dB) while the SIGNAL 1 (output light signal of an optical device of the present invention as illustrated in FIG. 2) shows the variation rate of 0.2 decibels (dB). Considering the lower variation rate, the output characteristic is improved in the present invention. This is because the absorbing optical fiber 16 continuously absorbs the reflected light rays.

Figure 11:
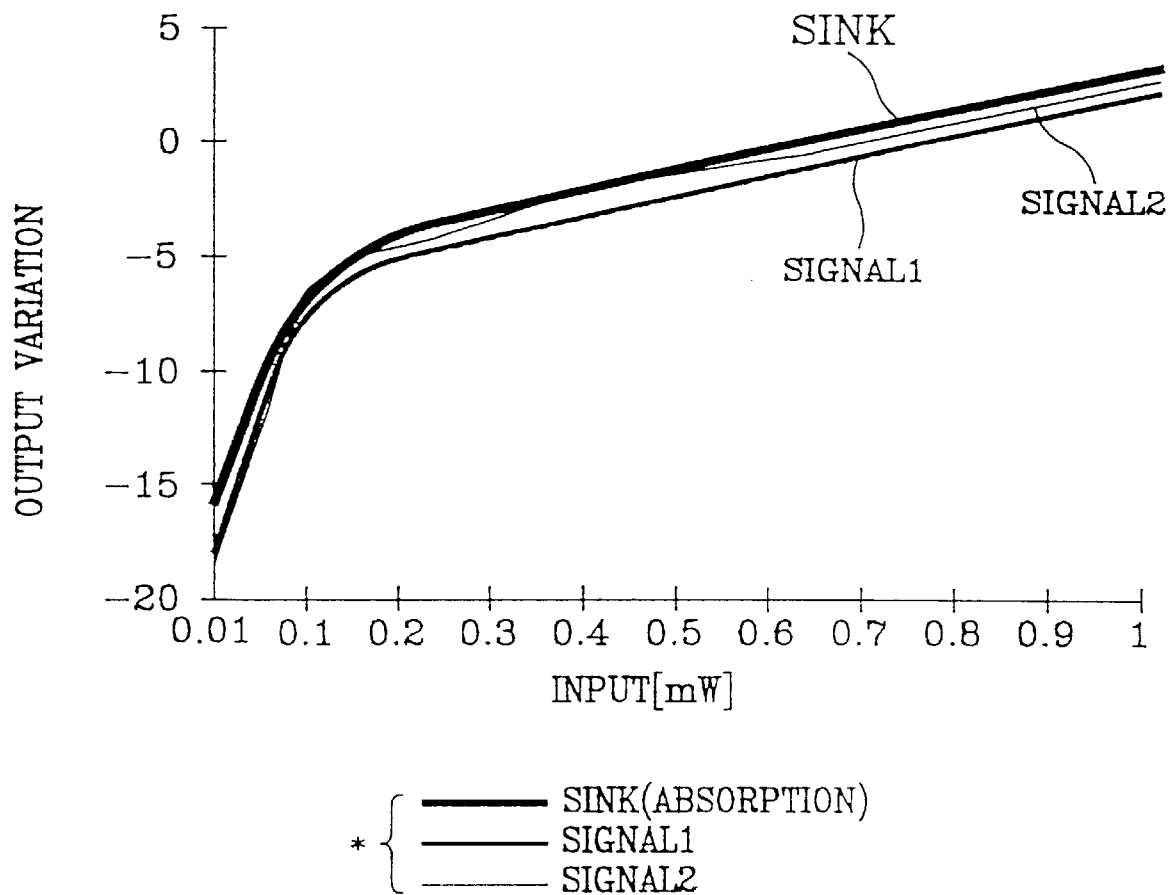
FIG. 11 is a graph illustrating output variations of the inventive optical device, built according to the principles of the present invention, with input light beam.

FIG. 11 shows a graph of output variations versus input power. The ferrule 18 of the present invention represents a more linear variation of the input and output. The ferrule 96 of the contemporary practice represents unstable outputs along the input values.

Figure 4:
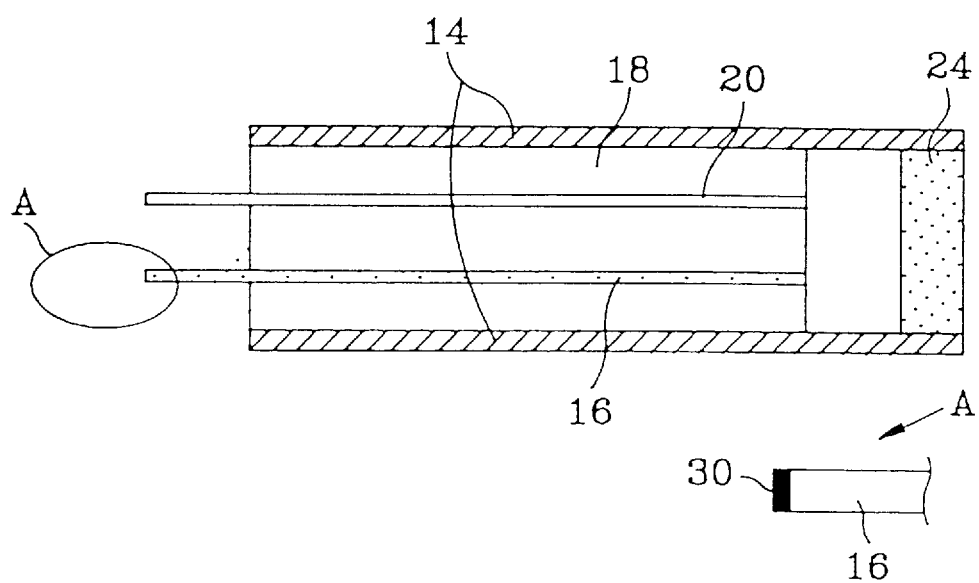
FIG. 4 is a schematic diagram illustrating an optical device built according to the principles of another embodiment of the present invention and a multiple reflection mechanism thereof.

FIGS. 3 and 4 show another embodiment of the present invention, an embodiment different from the embodiment shown in FIG. 2. As shown in FIGS. 3 and 4, the inventive optical device includes a signal transmission optical fiber 20 for transmitting an input light signal 10 to an output port (and for transmitting an output light signal to an input port), and a scattered light rays absorbing optical fiber 16 for absorbing multiply reflected light rays 22 generated in the optical device. The scattered light rays absorbing optical fiber 16 consists of a multiple mode optical fiber made of a glass material. The absorbing optical fiber 16 has an end forming a scattered light absorber 30 coated with a reflected light absorbing material such as impedance matching oil. This prevents the scattered light rays 12 absorbed by the absorbing optical fiber 16 from being transferred back to the output. Alternatively, the absorbing optical fiber 16 has the end finished at the outer end of the ferrule 18. This finished end is ground at an angle or is positioned in the ferrule 18 so as to prevent the scattered light rays 12 from being transferred to the output port. The signal transmission optical fiber 20 and the absorbing fiber 16 is fixedly held by the ferrule 18, which is coated with an AR coating in order to reduce the reflection loss. Also, a lens 24 is provided for focusing the input light signal applied through the signal transmission optical fiber 20. The ferrule 18 and the lens 24 are aligned by means of a sleeve 14.

A method of fabricating the present optical device includes the steps of fabricating the signal transmission optical fiber 20 for transmitting the input light signal 10 to the output port or for transmitting the output signal to the input port, fabricating the scattered light rays absorbing optical fiber 16 for absorbing the multiply reflected light rays 22 generated in the device to prevent the rays 22 from being fed back to the signal transmission optical fiber, providing the outer end of the absorbing optical fiber 16 with the scattered light absorber 30 coated with a reflection absorbing material or ground at an angle so as to prevent the scattered light rays 12 from being transmitted back to the output port, providing the ferrule 18 for fixedly holding the signal transmission optical fiber 20 and the absorbing optical fiber 16, fixing the signal transmission optical fiber 20 inside the ferrule 18, fixing the absorbing optical fiber 16 inside the ferrule at a distance "d" from the signal transmission optical fiber 20 (the distance "d" being a given multiple of the signal wavelength and preferably 0.125 millimeters), grinding the outer end surface of the ferrule 18 containing the signal transmission optical fiber 20 and the absorbing optical fiber 16, providing the lens 24 for focusing the input light signal 10 transferred through the signal transmission optical fiber 20, providing the sleeve 14 for aligning the ferrule 18 and the lens 24 within a given space, fixing the ferrule 18 and the lens 24 in the sleeve 14. Preferably, the outer end of the absorbing optical fiber 16 is positioned inside the ferrule. The outer diameter "D" of the ferrule 18 is selected to accommodate to the optical device.

In an operation, the input light signal 10 is transmitted through the signal transmission optical fiber 20 to the inner end of the lens 24. At this time, a part of the input light signal 10 is changed into multiply reflected light rays 22 between the ferrule 18 and the lens 24. The input light signal 10 is focused by the lens 24 applied to the output port. Most of the multiply reflected light rays 22 would have been absorbed by the absorbing optical fiber 16 and discharged to the outside as scattered light rays 12. Mostly, the scattered light rays 12 are blocked by the scattered light absorber 30 from being transferred back to the output port. Only slight amount of the multiply reflected light rays 22 is transmitted to the output port along with the input light signal 10.

Figure 5:
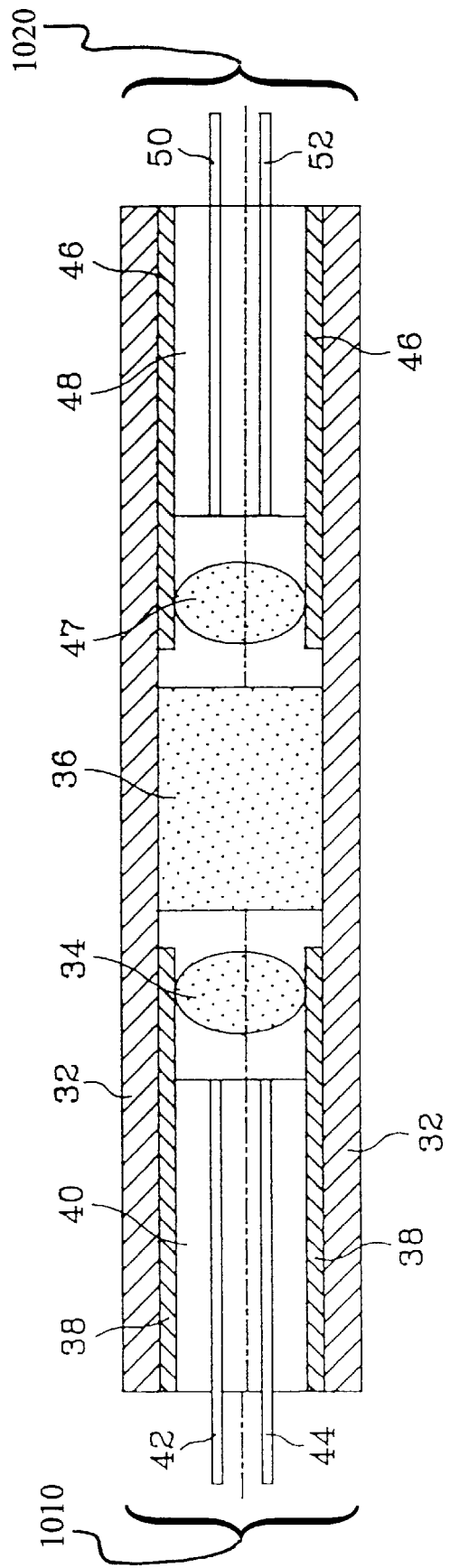
FIG. 5 is a schematic diagram illustrating an optical device consisting of 2×2 stages, built according to the principles of the present invention.

FIG. 5 shows an optical device consisting of 2×2 stages, which includes two transmission parts 1010, 1020 protected by a housing 32. Each transmission part includes a signal transmission optical fiber 42, 50 for transmitting a light signal, a scattered light rays absorbing optical fiber 44, 52 installed at a given distance from the signal transmission optical fiber to absorb multiply reflected light rays generated in the device, a ferrule 40, 48 for fixedly holding the signal transmission optical fiber 42, 50 and the absorbing optical fiber 44, 52, a lens 34, 47 installed at a given position from one end of the ferrule 40, 48 to focus a light signal transmitted through the signal transmission optical fiber 42, 50, and a sleeve 38, 46 for fixedly aligning the ferrule 40, 48 and the lens 34, 47. The two transmission parts are assembled with a filter 36 mounted between the two lenses 47 and 34 to reflect or to transmit the light transferred through the signal transmission optical fibers 42 and 50.

Figure 6:
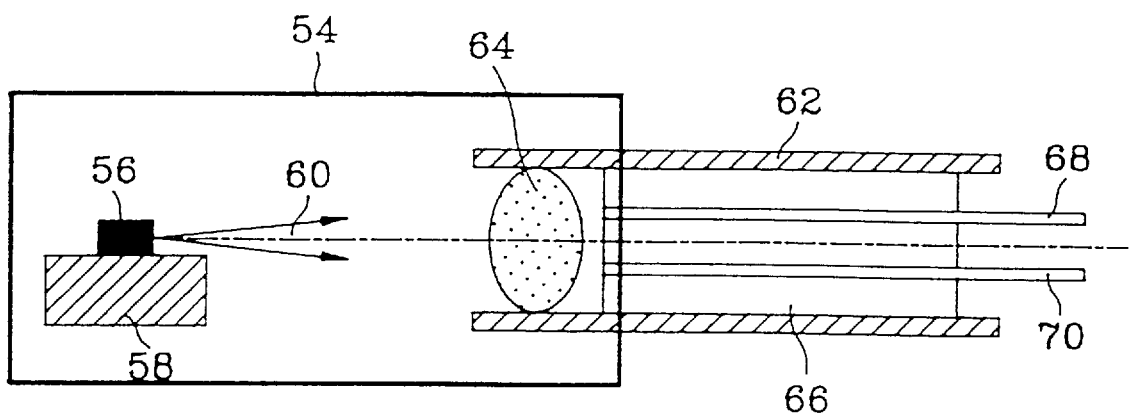
FIG. 6 is a schematic diagram illustrating the structure of a laser diode module fabricated according to principles of the present invention.

FIG. 6 shows an another embodiment of the present invention. According to the another embodiment of the present invention as shown in FIG. 6, a laser diode module includes a laser diode chip 56 for emitting a laser beam 60, a drive part 58 for supplying a voltage to the laser diode chip, a module case 54 for containing the laser diode module, and an optical device mounted towards the laser beam. The optical device includes a signal transmission optical fiber 68 for transmitting the laser beam, a scattered light rays absorbing optical fiber 70 installed at a given distance from the signal transmission optical fiber 68 to absorb multiply reflected light rays generated in the module case 54, a ferrule 66 for fixedly holding the signal transmission optical fiber 68 and the absorbing optical fiber 70, a lens 64 installed at a given position from one end of the ferrule 66 to focus the laser beam 60, and a sleeve 62 for fixedly aligning the ferrule 66 and the lens 64.

Figure 7:
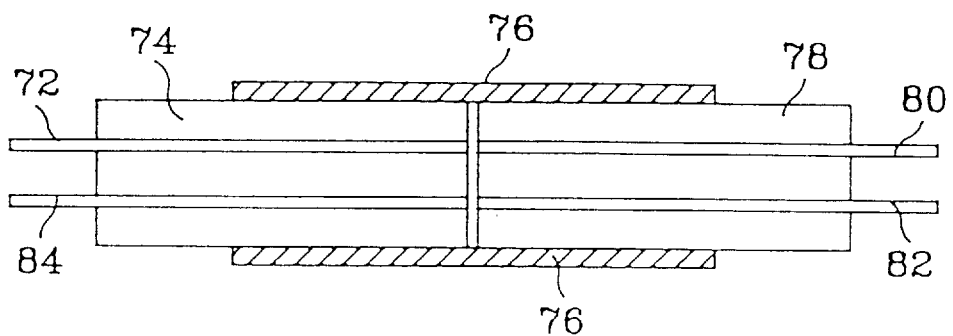
FIG. 7 is a schematic diagram illustrating the structure of an optical signal connector built according to the principles of the present invention.

FIG. 7 shows an optical signal connector consisting of two parts. Each of the two parts includes a signal transmission optical fiber 72, 80 for transmitting a light signal, a scattered light rays absorbing optical fiber 84, 82 installed at a given distance from the signal transmission optical fiber to absorb multiply reflected light rays generated in the connector, a ferrule 74, 78 for fixedly holding the signal transmission optical fiber 72, 80 and the absorbing optical fiber 84, 82. The ferrules 74 and 78, respectively containing the signal transmission optical fibers 72 and 80, are fixedly aligned by means of a housing 76.

Thus, most of the multiply reflected light rays generated in the optical transmission device are absorbed by the scattered light rays absorbing optical fiber and are discharged to the outside. In this way, the noises are eliminated. This improves and stabilizes the light signal transmission characteristics of an optical transmission system. This is required for transmitting a great amount of light signals at a high speed. In addition, an optical device of the present invention supplies a light signal linearly formed according to the output of a light source. Such an optical device of the present invention minimizes the signal distortions caused by the multiple reflection in a multiple wavelength and multiple time signal transmission system. Moreover, the light of the absorbing optical fiber may be utilized for monitoring a signal transmission line by means of detecting the changes according to time and according to external environment. Furthermore, the present invention makes it unnecessary to grind the end surface of the ferrule at a precise angle, thereby reducing cost.

What is claimed is:

1. An optical device, comprising:
    first and second transmission parts protected by a housing, each transmission part comprising:
        a signal transmission optical fiber permitting transmission of a light signal;
        a scattered light rays absorbing optical fiber installed at a given distance from said signal transmission optical fiber, said scattered light rays absorbing optical fiber absorbing multiply reflected light rays generated in said optical device;
        a ferrule fixedly holding said signal transmission optical fiber and fixedly holding said absorbing optical fiber;
        a lens installed at a given position from one end of said ferrule to focus the light signal transmitted through said signal transmission optical fiber; and
        a sleeve fixedly aligning said ferrule and said lens;
    said first and second transmission parts being assembled with a filter mounted between said two lenses, said first and second transmission parts reflecting and transmitting light transferred through said signal transmission optical fibers, said transmission parts preventing reflected light rays from being fed back to said signal transmission optical fibers.

2. An optical signal connector having two connector parts, each of said connector parts having a signal transmission optical fiber permitting transmission of a light signal, said optical signal connector comprising:
    a scattered light rays absorbing optical fiber installed at a given distance from said signal transmission optical fibers, said scattered light rays absorbing optical fiber absorbing multiply reflected light rays generated in said optical signal connector;
    a ferrule fixedly holding said signal transmission optical fibers and said absorbing optical fiber, said signal transmission optical fibers being fixedly aligned by means of a housing, said ferrule preventing reflected light rays from being fed back to said signal transmission optical fiber.

3. A method of fabricating an optical device for preventing scattered light rays generated in said optical device from being fed back to signal lines, comprising the steps of:
    fabricating a signal transmission optical fiber for transmitting an input light signal to an output port and for transmitting an output signal to an input port;
    fabricating a scattered light rays absorbing optical fiber for absorbing multiply reflected light rays generated in said optical device, said scattered light rays absorbing optical fiber preventing the multiply reflected light rays from being fed back to said signal transmission optical fiber;
    providing an outer end of said scattered light rays absorbing optical fiber with a scattered light absorber ground at an angle, said scattered light absorber preventing scattered light rays from being transmitted back to said output port;
    providing a ferrule for fixedly holding said signal transmission optical fiber and for fixedly holding said scattered light rays absorbing optical fiber;
    fixing said signal transmission optical fiber inside said ferrule;
    fixing said scattered light rays absorbing optical fiber inside said ferrule and at a distance from said signal transmission optical fiber, said distance being a given multiple of the signal wavelength;
    grinding the outer end surface of said ferrule containing said signal transmission optical fiber and absorbing optical fiber;
    providing a lens focusing said input light signal transferred through said signal transmission optical fiber;

providing a sleeve for aligning said ferrule and said lens with a given space; and fixing said ferrule and lens in said sleeve.

4. The method of claim 3, wherein an outer diameter of said ferrule is selected to accommodate to said optical device.

5. The method of claim 3, wherein said distance between said signal transmission optical fiber and said scattered light rays absorbing optical fiber is about 0.125 millimeters.

6. The method of claim 3, wherein said outer end of said absorbing optical fiber is positioned inside said ferrule.

7. An optical device, comprising:

a first optical fiber, said first optical fiber permitting transmission of an input light signal to an output port;

a second optical fiber, said second optical fiber absorbing multiply reflected light rays generated in said optical device;

a ferrule fixedly holding said first optical fiber and fixedly holding said second optical fiber;

a lens focusing said input light signal transmitted through said first optical fiber; and a sleeve fixedly aligning said ferrule and said lens, said sleeve preventing the reflected light rays from being fed back to said first optical fiber.

8. The optical device of claim 7, wherein said second optical fiber comprises a multiple mode optical fiber.

9. The optical device of claim 7, wherein said second optical fiber is made of a glass material.

10. The optical device of claim 7, wherein a surface of said ferrule is coated with an anti-reflective coating.

11. The optical device of claim 7, wherein said first optical fiber permits transmission of an output light signal to an input port.

12. An optical device, comprising:

a first optical fiber, said first optical fiber permitting transmission of an input light signal to an output port;

a second optical fiber, said second optical fiber absorbing multiply reflected light rays generated in said optical device and absorbing scattered light rays generated in said optical device;

a scattered light absorber provided on one end of said second optical fiber, said scattered light absorber being coated with a reflected light absorbing material, said scattered light absorber preventing the scattered light rays absorbed by said second optical fiber from being transferred back to said output port;

a ferrule fixedly holding said first optical fiber and said second optical fiber;

a lens focusing said input light signal transmitted through said first optical fiber; and a sleeve fixedly aligning said ferrule and said lens, said sleeve preventing the reflected light rays from being fed back to said first optical fiber.

13. The optical device of claim 12, wherein said reflected light absorbing material is an impedance matching oil.

14. The optical device of claim 12, wherein said second optical fiber has a first end finished at an outer end of said ferrule, said first end preventing said scattered light rays from being fed back to said output port.

15. The optical device of claim 14, wherein said first end of said light scattering absorbing optical fiber is ground at an angle.

16. The optical device of claim 14, wherein said first end of said light scattering absorbing optical fiber is positioned in said ferrule, so as to prevent said scattered light rays from being transferred to said output port.

17. The optical device of claim 12, wherein said second optical fiber comprises a multiple mode optical fiber.

18. The optical device of claim 12, wherein said second optical fiber is made of a glass material.

19. The optical device of claim 12, wherein a surface of said ferrule is coated with an anti-reflective coating.

20. The optical device of claim 12, wherein said first optical fiber permits transmission of an output light signal to an input port.

21. An optical device, comprising:

a laser diode chip emitting a laser beam;

a drive part supplying a voltage to said laser diode chip;

a module case providing housing;

an optical apparatus mounted towards said laser beam, said optical apparatus including a signal transmission optical fiber permitting transmission of said laser beam;

a scattered light rays absorbing optical fiber installed at a given distance from said signal transmission optical fiber, said scattered light rays absorbing optical fiber absorbing multiply reflected light rays generated in said module case;

a ferrule fixedly holding said signal transmission optical fiber and said scattered light rays absorbing optical fiber;

a lens installed at a given position from one end of said ferrule, said lens focusing said laser beam; and a sleeve fixedly aligning said ferrule and said lens, said sleeve preventing the reflected light rays from being fed back to said signal transmission optical fiber.

* * * * *